US010245651B2

United States Patent
Wu (10) Patent No.: US 10,245,651 B2
(45) Date of Patent: Apr. 2, 2019

(54) HYDRAULIC CHUCK

(71) Applicant: Hsuan-Lung Wu, Taichung (TW)

(72) Inventor: Hsuan-Lung Wu, Taichung (TW)

( * ) Notice: Subject to any disclaimer, the term of this patent is extended or adjusted under 35 U.S.C. 154(b) by 120 days.

(21) Appl. No.: 15/666,665

(22) Filed: Aug. 2, 2017

(65) Prior Publication Data
US 2019/0039150 A1 Feb. 7, 2019

(51) Int. Cl.
*B23B 31/30* (2006.01)

(52) U.S. Cl.
CPC ........ *B23B 31/302* (2013.01); *B23B 2231/36* (2013.01); *B23B 2260/126* (2013.01)

(58) Field of Classification Search
CPC .............. B23B 31/302; B23B 2231/36; B23B 2260/126; B23B 31/204; B23B 2260/142; B23B 31/402; B23B 31/4026; B23B 31/16216; B23B 31/1622

See application file for complete search history.

(56) References Cited

FOREIGN PATENT DOCUMENTS

| DE | 2621242 A1 | * | 11/1977 | ........... B23B 31/204 |
| FR | 1492729 A | * | 8/1967 | ....... B23B 31/16045 |
| JP | 58056712 A | * | 4/1983 | ........... B23B 31/204 |

* cited by examiner

*Primary Examiner* — Daniel W Howell
*Assistant Examiner* — Paul M Janeski
(74) *Attorney, Agent, or Firm* — Trop Pruner & Hu, P.C.

(57) ABSTRACT

A hydraulic chuck includes a chuck body, a fixed seat, a rotary seat and a plurality of flexible seal members. The fixed seat is fixedly mounted to the chuck body. The rotary seat is rotatably mounted to the fixed seat and cooperates with the fixed seat to define a gap therebetween. Each of the seal members has a first annular segment fixedly mounted to the fixed seat, a neck segment extending from the first annular segment and through the gap, and a second annular segment connected to an end of the neck segment distal from the first annular segment, and disposed adjacent to the rotary seat.

8 Claims, 7 Drawing Sheets

HYDRAULIC CHUCK

FIELD

The disclosure relates to a hydraulic chuck, and more particularly to a hydraulic chuck with seal means.

BACKGROUND

A conventional hydraulic chuck disclosed in Taiwanese Patent No. 557239 includes a chuck body, a fixed seat fixedly mounted in the chuck body, a rotary seat rotatably mounted in the fixed seat, a driving seat moveably mounted to the rotary seat, a front jaw unit, a rear jaw unit, and an oil path that passes through the chuck body, the fixed seat and the rotary seat. When pressurized oil flows through the oil path to move the driving seat, the driving seat drives the front and rear jaw units to grip or to release a workpiece.

A gap through which the pressurized oil flows is formed between an outer surface of the rotary seat and an inner surface of the fixed seat, and a plurality of seal rings may be disposed between the outer surface of the rotary seat and the inner surface of the fixed seat to prevent leakage of the pressurized oil. When the pressurized oil flows through the gap to adjust the front and rear jaw units, the seal rings are deformed by the pressurized oil so as to seal up the gap to prevent leakage of the pressurized oil. When the pressurized oil is prevented from flowing through the gap after the adjustment of the front and rear jaw units, the seal rings are restored to permit relative rotation between the rotary seat and the fixed seat.

However, each of the seal rings may have a circular cross-section, and may not be sufficiently deformed enough to seal up the gap when the pressurized oil flows through. If the pressure of the oil is increased in order to increase the degree of deformation of the seal rings, more serious leakage of the pressurized oil would have occurred.

Moreover, if the seal rings are designed to constantly seal up the gap even when the rotary seat rotates relative to the fixed seat, the seal rings may be easily worn out, and may be deteriorated due to the high-temperature resulted from the frictional contact among the seal rings and the rotary seat.

SUMMARY

Therefore, an object of the disclosure is to provide a hydraulic chuck that can alleviate at least one of the drawbacks of the prior art.

According to the disclosure, the hydraulic chuck is for griping at least one workpiece, and includes a chuck body, a fixed seat, a rotary seat, a plurality of flexible seal members and a driving seat unit. The fixed seat is fixedly mounted to the chuck body, and has a side surface. The rotary seat is mounted to the fixed seat and is rotatable relative to the fixed seat about a central axis. The rotary seat has a side surface that faces toward the side surface of the fixed seat. The side surface of the fixed seat and the side surface of the rotary seat cooperatively define a gap therebetween that permits pressurized oil to flow therethrough. Each of the seal members is centered at the central axis and has a first annular segment that is fixedly mounted to the fixed seat, a neck segment that extends from the first annular segment and through the gap, and a second annular segment that is connected to an end of the neck segment distal from the first annular segment, that is disposed adjacent to the rotary seat and that cooperated with the first annular segment and the neck segment to define at least one oil groove thereamong. The second annular segments of at least one adjacent pair of the seal members are pushed to be in contact with the rotary seat when the pressurized oil is introduced into the gap. The second annular segments of the seal members are spaced apart from the rotary seat when the pressurized oil is ceased to be introduced into the gap. The driving seat unit is movably mounted to the rotary seat and is moved by the pressurized oil for griping or releasing the workpiece.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
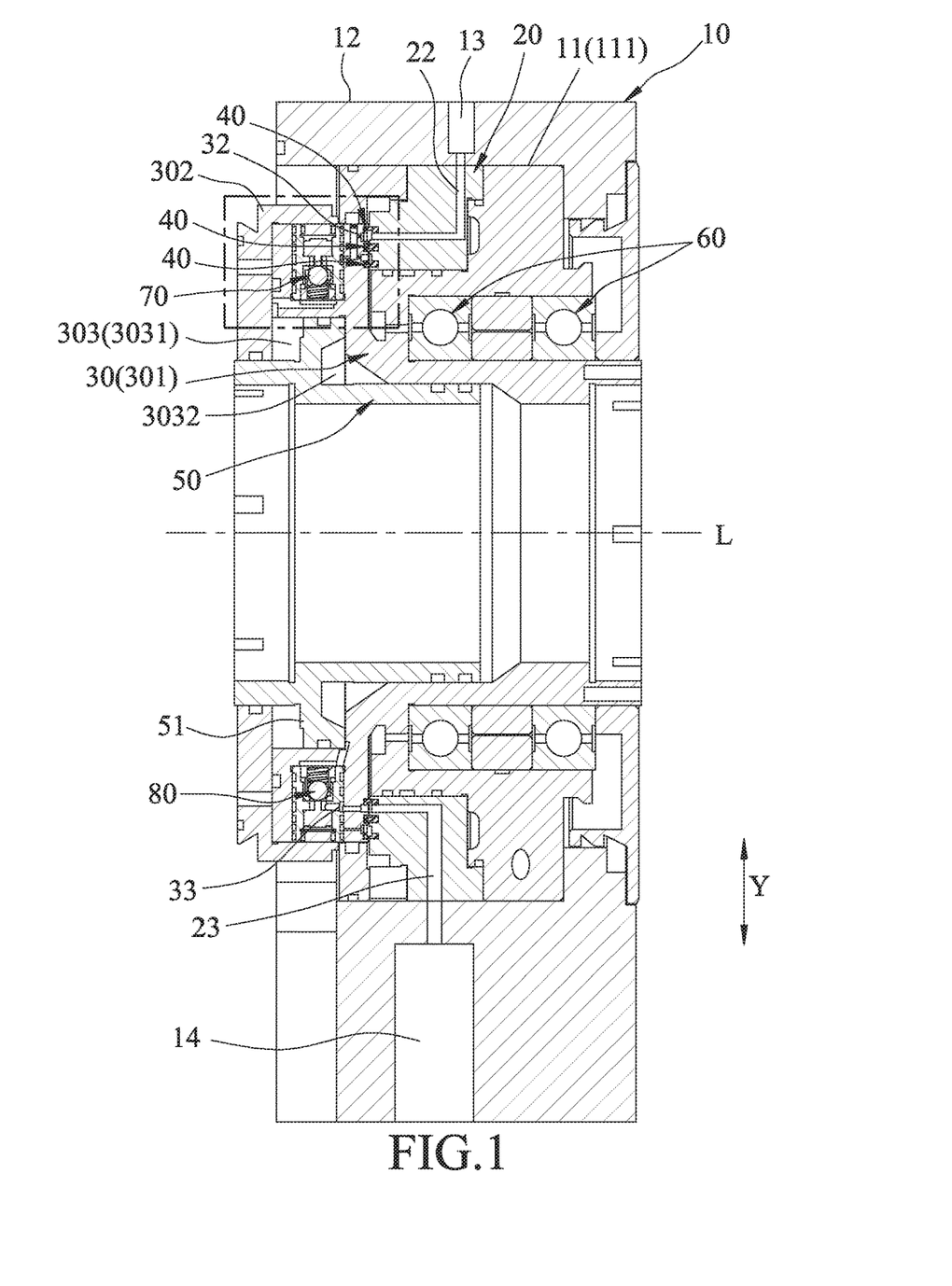
FIG. 1 is a sectional view illustrating an embodiment of the hydraulic chuck according to the disclosure.
Figure 2:
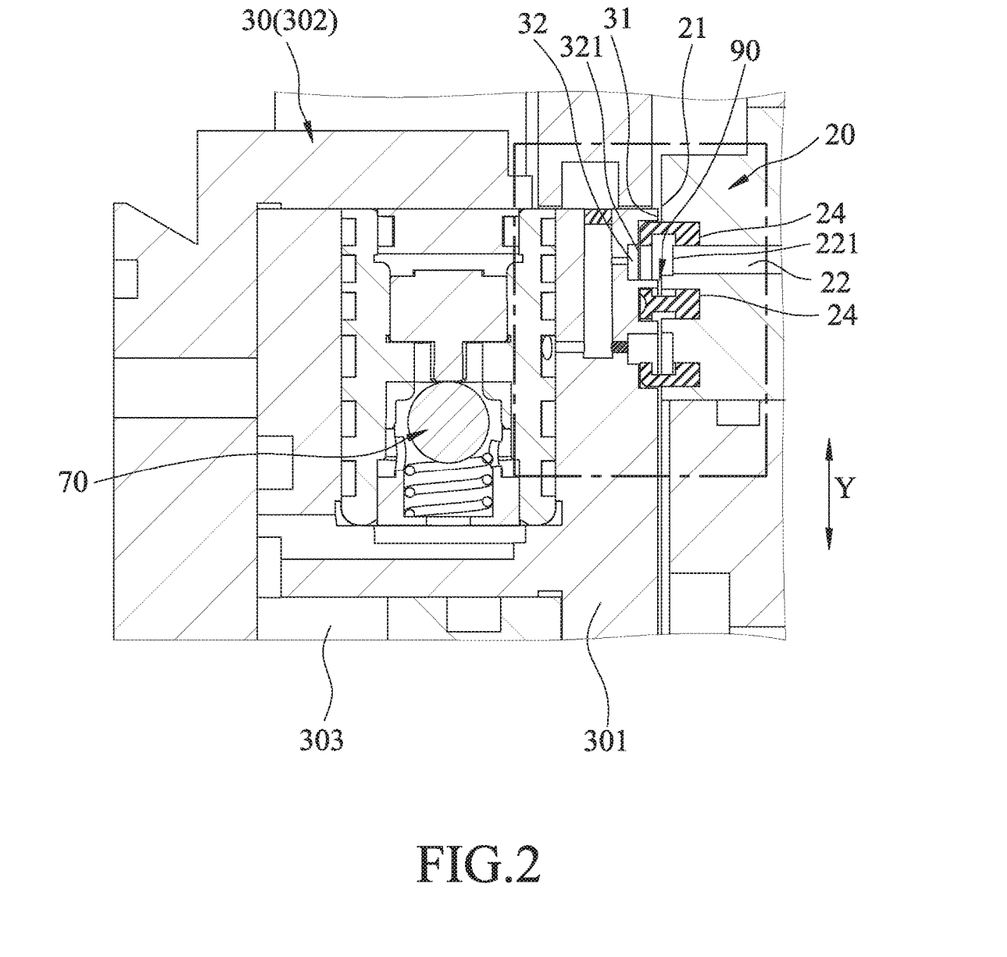
FIG. 2 is an enlarged fragmentary sectional view of the embodiment.
Figure 3:
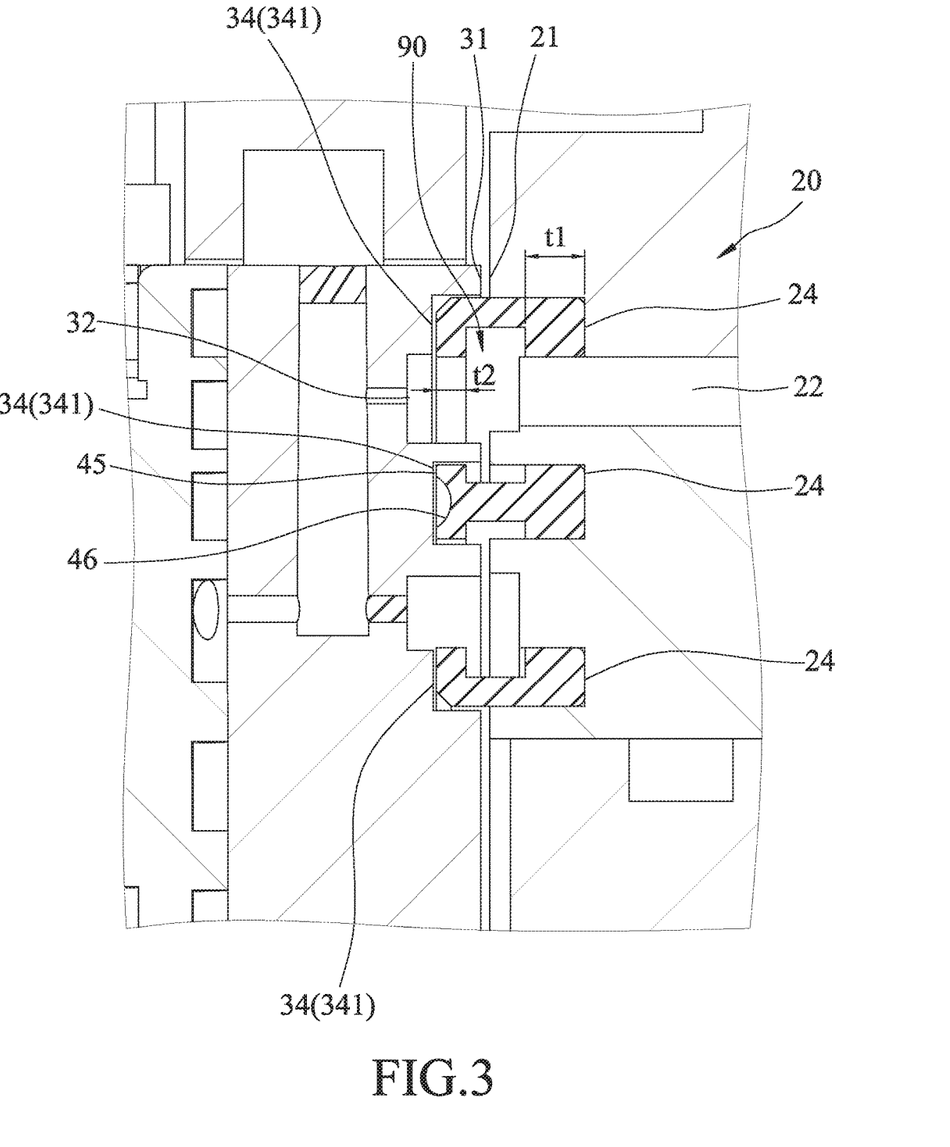
FIG. 3 is another enlarged fragmentary sectional view of the embodiment.

Referring to FIGS. 1 to 3, the embodiment of the hydraulic chuck according to the disclosure is for griping at least one workpiece, and includes a chuck body 10, a fixed seat 20, a rotary seat 30, a plurality of flexible seal members 40, a driving unit 50, two bearings 60 that are mounted between the fixed seat 20 and the rotary seat 30, a first one-way valve 70 and a second one-way valve 80.

The chuck body 10 has an inner surrounding surface 11 that defines an inner hole 111, an outer surrounding surface 12 that is opposite to the inner surrounding surface 11, a first guide hole 13 that is formed through the inner and outer surrounding surfaces 11, 12, and a second guide hole 14 that is formed through the inner and outer surrounding surfaces 11, 12 and that is spaced apart from the first guide hole 13. The inner hole ill extends along a central axis (L).

The fixed seat 20 is fixedly mounted to the inner hole 111 of the chuck body 10, and has a side surface 21 that is substantially perpendicular to the central axis (L), a first oil inlet channel 22 that is in fluid communication with the first guide hole 13 and that has a first opening 221 (see FIG. 2) formed through the side surface 21, a second oil inlet channel 23 that is in fluid communication with the second guide hole 14 and that has a second opening 231 (see FIG. 7) formed through the side surface 21, and a plurality of fixed annular grooves 24 that are formed in the side surface 21. A distance between the first opening 221 of the first oil inlet channel 22 and the central axis (L) is different from that between the second opening 231 of the second oil inlet channel 23 and the central axis (L). Each of the fixed annular grooves 24 is centered at the central axis (L) and is spaced apart from the other fixed annular grooves 24 in a radial direction (Y).

A distance between at least one of the fixed annular grooves 24 and the central axis (L) is greater than either of the distance between the first opening 221 of the first oil inlet channel 22 and the central axis (L) and the distance between the second opening 231 of the second oil inlet channel 23 and the central axis (L). A distance between at least one of the fixed annular grooves 24 and the central axis (L) is smaller than either of the distance between the first opening 221 of the first oil inlet channel 22 and the central axis (L) and the distance between the second opening 231 of the second oil inlet channel 23 and the central axis (L). A distance between at least one of the fixed annular grooves 24 and the central axis (L) falls between the distance between the first opening 221 of the first oil inlet channel 22 and the central axis (L) and the distance between the second opening 231 of the second oil inlet channel 23 and the central axis (L). The first opening 221 of the first oil inlet channel 22 is in fluid communication with a space between an adjacent pair of the fixed annular grooves 24, and the second opening 231 of the second oil inlet channel 23 is in fluid communication with a space between another adjacent pair of the fixed annular grooves 24.

In this embodiment, the fixed seat 20 has three fixed annular grooves 24 each of which is centered at the central axis (L) and is spaced apart from the other fixed annular grooves 24 in the radial direction (Y). The first opening 221 of the first oil inlet channel 22 is in fluid communication with a space between the outer one and the middle one of the fixed annular grooves 24 and the second opening 231 of the second oil inlet channel 23 is in fluid communication with a space between the middle one and the inner one of the fixed annular grooves 24.

The rotary seat 30 is mounted to the fixed seat 20, and is rotatable relative to the fixed seat 20 about the central axis (L). The rotary seat 30 includes a main body 301, and an auxiliary body 302 that is co-rotatably mounted to the main body 301 and that cooperates with the main body 301 to define an operating space 303 therebetween. The main body 301 has a side surface 31 that is substantially perpendicular to the central axis (L) and that faces toward the side surface 21 of the fixed seat 20, a first oil path 32 that is in fluid communication with the operating space 303 and that has a first opening 321 (see FIG. 2) formed through the side surface 31, a second oil path 33 that is in fluid communication with the operating space 303 and that has a second opening 331 (see FIG. 7) formed through the side surface 31, and a plurality of rotary annular grooves 34 that are formed in the side surface 31 and that are respectively aligned with the fixed annular grooves 24 in the direction of the central axis (L). A distance between the first opening 321 of the first oil path 32 and the central axis (L) is different from that between the second opening 331 of the second oil path 33 and the central axis (L). The first opening 321 of the first oil path 32 is in fluid communication with a space between an adjacent, pair of the rotary annular grooves 34, and the second opening 331 of the second oil path 33 is in fluid communication with a space between another adjacent pair of the rotary annular grooves 34. Each of the rotary annular grooves 34 is defined by a groove-defining surface 341 (see FIGS. 3, 5 and 7). The first oil path 32 and the second oil path 33 are respectively in fluid communication with two opposite ends of the operating space 303 along the central axis (L). The side surface 21 of the fixed seat 20 and the side surface 31 of the rotary seat 30 cooperatively define a gap 90 therebetween that permits pressurized oil to flow therethrough and that is in fluid communication with the first and second oil inlet channels 22, 23 and the first and second oil paths 32, 33.

In this embodiment, the rotary seat 30 has three rotary annular grooves 34 that are respectively aligned with the fixed annular grooves 24 in the direction of the central axis (L). The first opening 321 of the first oil path 32 is in fluid communication with a space between the outer one and the middle one of the rotary annular grooves 34, and the second opening 331 of the second oil path 33 is in fluid communication with a space between the middle one and the inner one of the rotary annular grooves 34. The rotary seat 30 further includes a first backflow path (not shown) that is in fluid communication with the operating space 303 and the space between the middle one and the inner one of the rotary annular grooves 34, and a second backflow path (not shown) that is in fluid communication with the operating space 303 and the space between the outer one and the middle one of the rotary annular grooves 34.

Figure 5:
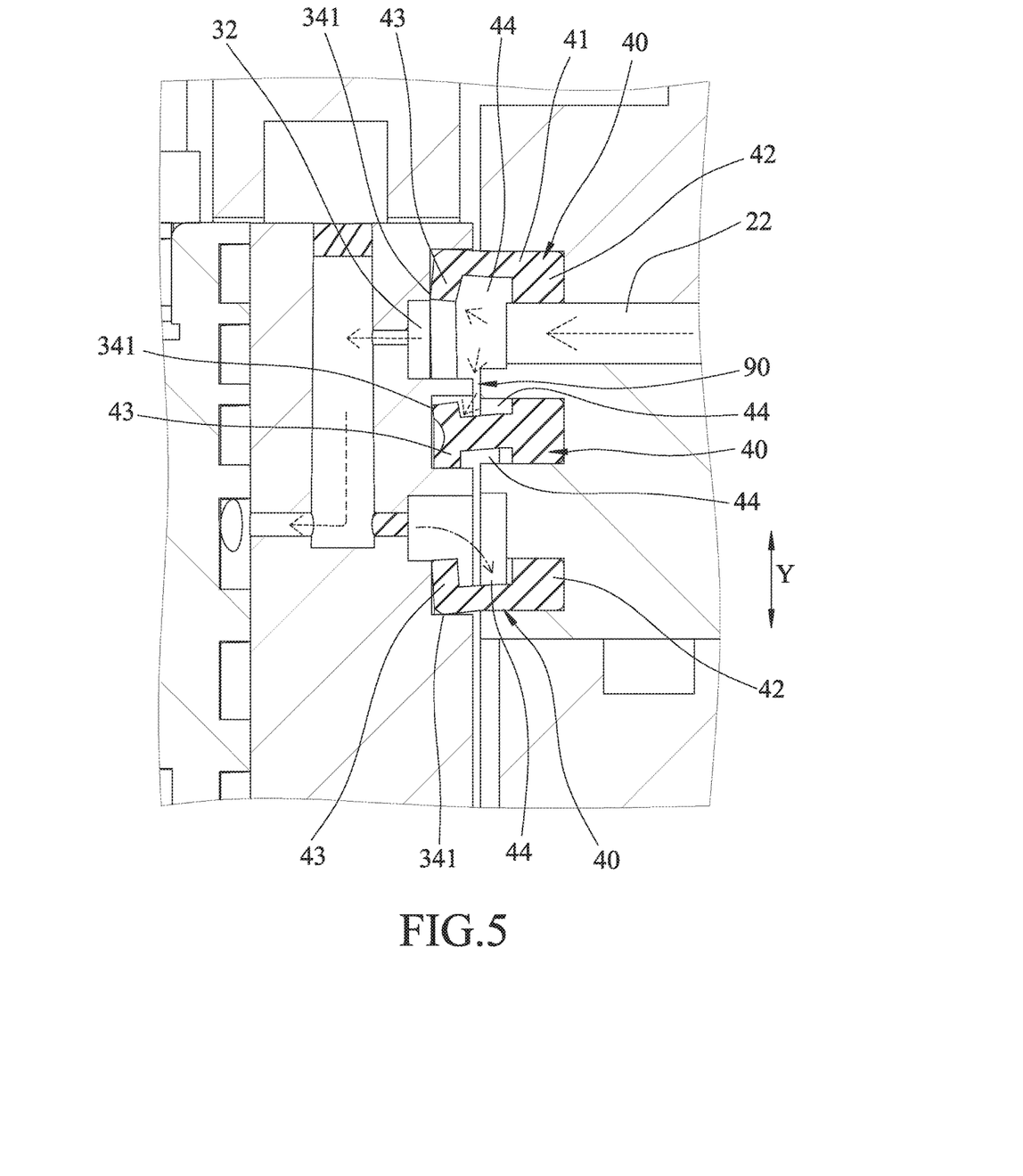
FIG. 5 is a schematic enlarged fragmentary sectional view illustrating the pressurized oil being introduced into the first oil inlet channel.
Figure 7:
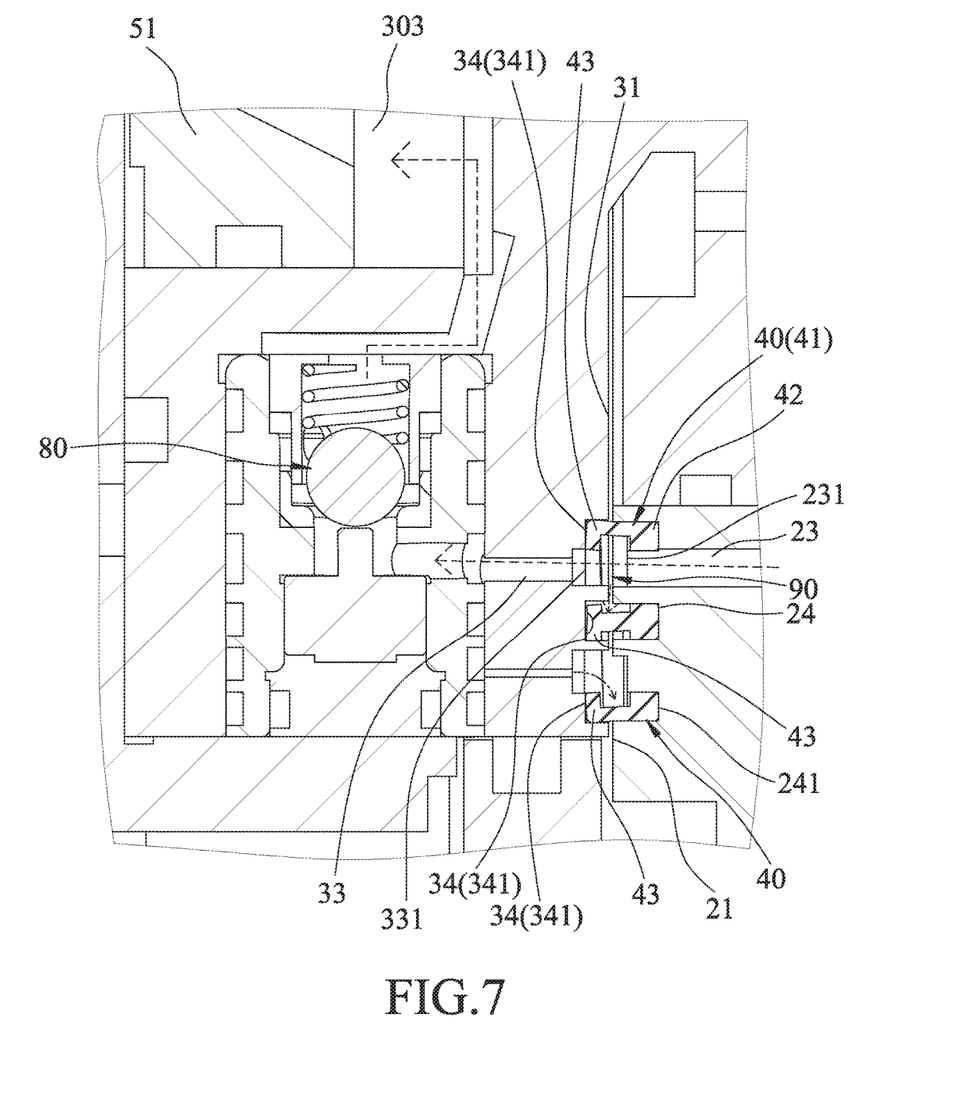
FIG. 7 is a schematic enlarged fragmentary sectional view illustrating the pressurized oil being introduced into the second oil inlet channel.

With further reference to FIGS. 5 and 7, each of the seal members 40 has a first annular segment 42 that is fixedly mounted to a respective one of the fixed annular grooves 24, a neck segment 41 that extends from the first annular segment 42 through the gap 90 into the corresponding one of the rotary annular grooves 34 that is aligned with the respective one of the fixed annular grooves 24, and a second annular segment 43 that is connected to the neck segment 41, that is movably retained in the corresponding one of the rotary annular grooves 34 and that cooperates with the first annular segment 42 and the neck segment 41 to define at least one oil groove 44 thereamong (see FIG. 5). For each of the seal members 40, the thickness of the second annular segment 43 in the radial direction (Y) is smaller than the width of the corresponding one of the rotary annular grooves 34 in the radial direction (Y), and the thickness (t2, see FIG. 3) of the second annular segment 43 in the direction of the central axis (L) is smaller than the thickness (t1, see FIG. 3) of the first annular segment 42 in the direction of the central axis (L). A distance between at least one of the seal members 40 and the central axis (L) is greater than either of the distance between the first opening 321 of the first oil path 32 and the central axis (L) and the distance between the second opening 331 of the second oil path 33 and the central axis (L). A distance between at least one of the seal members 40 and the central axis (L) is smaller than either of the distance between the first opening 321 of the first oil path 32 and the central axis (L) and the distance between the second opening 331 of the second oil path 33 and the central axis (L). A distance between at least one of the seal members 40 and the central axis (L) falls between the distance between the first opening 321 of the first oil path 32 and the central axis (L) and the distance between the second opening 331 of the second oil path 33 and the central axis (L).

In this embodiment, there are three seal members 40 that are respectively and fixedly mounted to the fixed annular grooves 24 and that respectively extend into the rotary annular grooves 34 through the gap 90. The second annular segment 43 of the middle one of the seal members 40 has an end surface 45 that faces away from the first annular segment 42, and a U-groove 46 that is formed in the end surface 45. The U-groove 46 serves to increase the flexibility of the middle one of the seal members 40. The first annular segment 42, the neck segment 41 and the second annular segment 43 of each of the inner one and the outer one of the seal members 40 cooperatively define an oil groove 44 thereamong. The first annular segment 42, the neck segment 41 and the second annular segment 43 of each of the middle one of the seal members 40 cooperatively define two oil grooves 44 thereamong that faces away from each other.

In one embodiment, for each of the seal members 40, the thickness of the neck segment 41 in the radial direction (Y) is smaller than the thickness of the first annular segment 42 in the radial direction and smaller than the thickness of the second annular segment 43 in the radial direction (Y).

The driving unit 50 includes a driving seat 51 that is movably mounted to the rotary seat 30 and that divides the operating space 303 into first and second space portions 3031, 3032 that are disposed along the central axis (L). The first oil path 32 and the second oil path 33 are respectively in fluid communication with the first and second space portions 3031, 3032 of the operating space 303. The driving seat 51 can be moved by pressurized oil introduced into the first or second space portion 3031, 3032, and cooperates with a cap member (not shown) a jaw unit (not shown) and a pull rod (not shown) in a known manner to grip or release the workpiece.

The first one-way valve 70 is mounted in the main body 301 of the rotary seat 30, and is disposed on the first oil path 32. The first one-way valve 70 permits the pressurized oil to flow from the first oil inlet channel 22 into the first space portion 3031 of the operating space 303 therethrough, and prevents the pressurized oil from flowing from the first space portion 3031 of the operating space 303 back to the first oil inlet channel 22 therethrough.

The second one-way valve 80 is mounted in the main body 301 of the rotary seat 30, and is disposed on the second oil path 33. The second one-way valve 80 permits the pressurized oil to flow from the second oil inlet channel 23 into the second space portion 3032 of the operating space 303 therethrough, and prevents the pressurized oil from flowing from the second space portion 3032 of the operating space 303 back to the second oil inlet channel 23 therethrough. The operation of the first and second one-way valves 70, 80 are known in the art.

Referring to FIGS. 1 to 3, when the pressurized oil is not introduced into the first guide hole 13 or the second guide hole 14, the second annular segment 43 of each of the seal members 40 (see FIGS. 5 and 7) is spaced apart from the groove-defining surface 341 of the corresponding one of the rotary annular grooves 34. Thus, the rotary seat 30 is permitted to rotate relative to the fixed seat 20 without being in contact with the seal members 40, and the seal members 40 are therefore prevented from deterioration due to high temperature.

Figure 4:
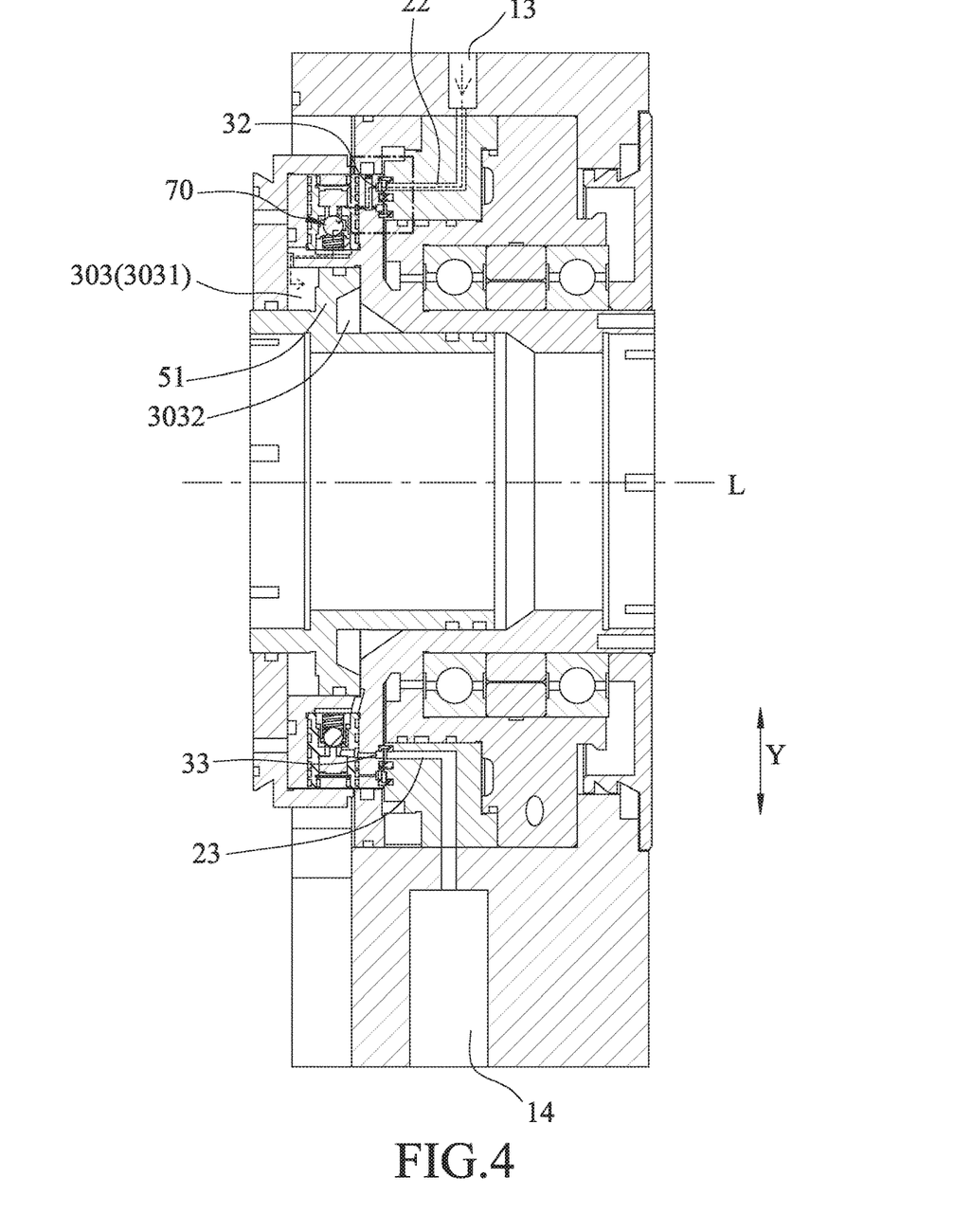
FIG. 4 is a schematic sectional view illustrating pressurized oil being introduced into a first oil inlet channel of the embodiment.

Referring to FIGS. 4 and 5, when the pressurized oil is introduced into the first guide hole 13 and flows through the first oil inlet channel 22, the gap 90, the first mil path 32 and the first one-way valve 70, and into the first space portion 3031 of the operating space 303 to move the driving seat 51 toward the right side of FIG. 4 (see the arrows represented by dotted broken lines in FIGS. 4 and 5), the outer one of the seal members 40 and the middle one of the seal members 40 are pushed by the pressurized oil to deform away from. each other, such that the second annular segment 43 of the outer one of the seal members 40 is in contact with the groove-defining surface 341 defining the corresponding rotary annular groove 34 and that the second annular segment 43 of the middle one of the seal members 40 is in contact with the groove-defining surface 341 defining the corresponding rotary annular groove 34, so as to prevent outflow of the pressurized oil from the space between the outer one of the seal members 40 and the middle one of the seal members 40 and to prevent inflow of the pressurized oil into the second oil inlet channel 23 and the second oil path 33. At the same time, the low-pressure oil in the second space portion 3032 of the operating space 303 is forced to flow through the first backflow path (not shown) and the space between the middle one and the inner one of the rotary annular grooves 34 (see the arrow represented by dash-dot broken lines in FIG. 5) to push the inner one of the seal members 40 to deform inwardly, such that the second annular segment 43 of the inner one of the seal members 40 is in contact with the groove-defining surface 341 defining the inner one of the rotary annular grooves 34 so as to prevent outflow of the low-pressure oil from the space between the middle one and the inner one of the rotary annular grooves 34. When the pressurized oil has ceased to be introduced into the first guide hole 13 after the movement of the driving seat 51, the seal members 40 are restored to the state illustrated in FIG. 3, and the rotary seat 30 is permitted to rotate relative to the fixed seat 20 without being in contact with the seal members 40.

Figure 6:
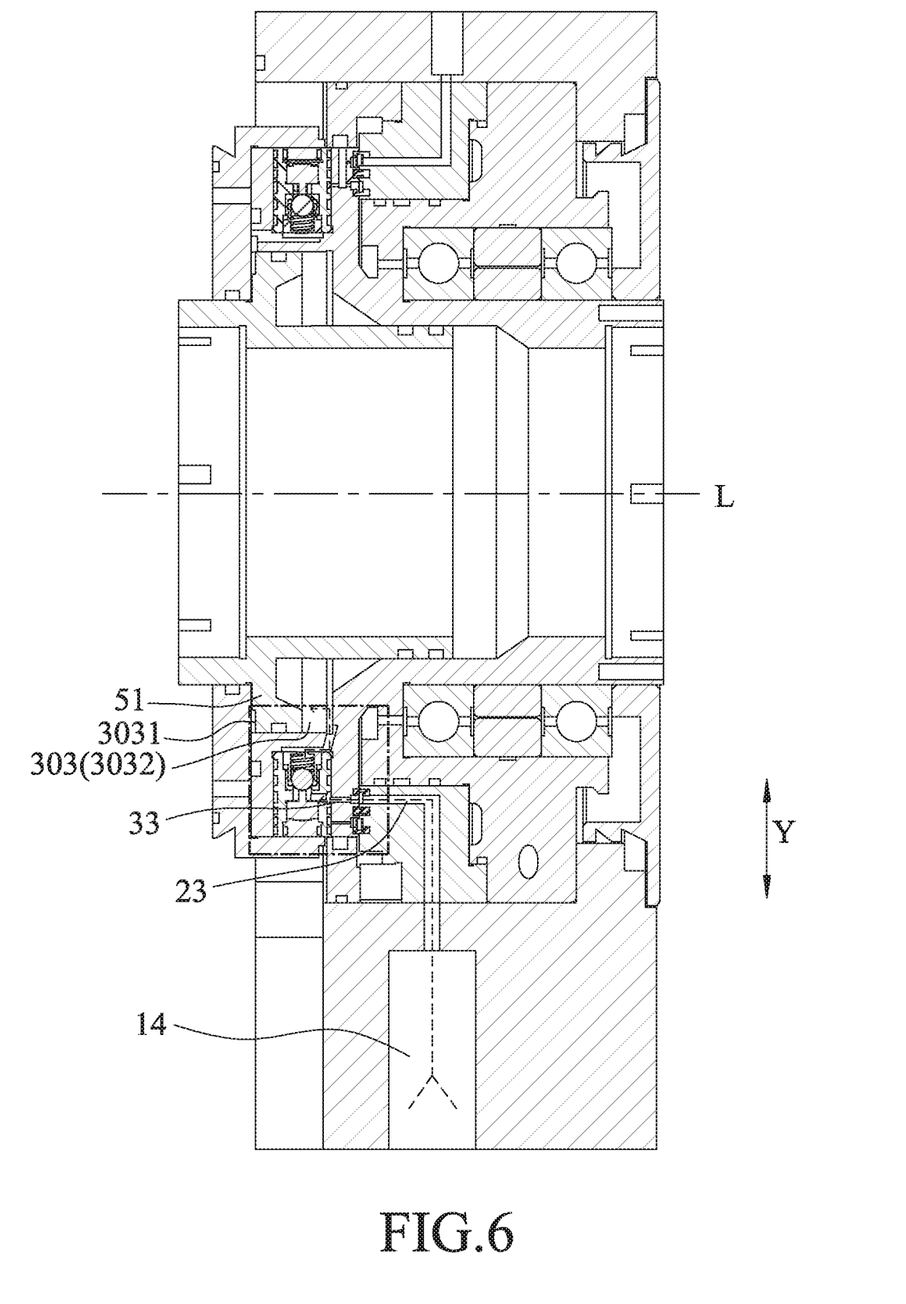
FIG. 6 is a schematic sectional view illustrating the pressurized oil being introduced into a second oil inlet channel of the embodiment.

Referring to FIGS. 6 and 7, when the pressurized oil is introduced into the second guide hole 14 and flows through the second oil inlet channel 23, the gap 90, the second oil path 33 and the second one-way valve 80 and flows into the second space portion 3032 of the operating space 303 to move the driving seat 51 toward the left side of FIG. 6 (see the arrows represented by dotted broken lines in FIGS. 6 and 7), the inner one of the seal members 40 and the middle one of the seal members 40 are pushed by the pressurized oil to deform away from each other, such that the second annular segment 43 of the inner one of the seal members 40 is in contact with the groove-defining surface 341 defining the corresponding rotary annular groove 34 and that the second annular segment 43 of the middle one of the seal members 40 is in contact with the groove-defining surface 341 defining the corresponding rotary annular groove 34, so as to prevent outflow of the pressurized oil from the space between the inner one of the seal members 40 and the middle one of the seal members 40 and inflow of the pressurized oil into the first oil inlet channel 22 and the first oil path 32. At the same time, the low-pressure oil in the first space portion 3031 of the operating space 303 is forced to flow through the second backflow path (not shown) and the space between the middle one and the outer one of the rotary annular grooves 34 (see the arrow represented by dash-dot broken lines in FIG. 7) to push the outer one of the seal members 40 to deform outwardly, such that the second annular segment 43 of the outer one of the seal members 40 is in contact with the groove-defining surface 341 defining the outer one of the rotary annular grooves 34 so as to prevent outflow of the low-pressure oil from the space between the middle one and the outer one of the rotary annular grooves 34. When the pressurized oil has ceased to be introduced into the second guide hole 14 after the movement of the driving seat 51, the seal members 40 are restored to the state illustrated in FIG. 3, and the rotary seat 30 is permitted to rotate relative to the fixed seat 20 without being in contact with the seal members 40. Thus, the seal members 40 may be prevented from deterioration due to high temperature, extending its service life.

By virtue of the configuration of each of the seal members 40, when the pressurized oil is introduced into the first guide hole 13 or the second guide hole 14 to move the driving seat 51, the seal members 40 can be easily deformed by the pressurized oil to seal the gap 90. When the pressurized oil is ceased to be introduced into the first and second guide holes 13, 14 after the movement of the driving seat 51, the seal members 40 are restored to be spaced apart from the rotary seat 30, so that the rotary seat 30 is permitted to rotate relative to the fixed seat 20 without being in contact with the seal members 40, and that the seal members 40 are prevented from deterioration due to high temperature.

Moreover, since the U-groove 46 serves to increase the flexibility of the middle one of the seal members 40, the fluid-tightness of the middle one of the seal members 40 is enhanced when the pressurized ad is introduced into the first guide hole 13 or the second guide hole 14 for moving the driving seat 51.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hydraulic chuck adapted to grip at least one workpiece, comprising:
   a chuck body;
   a fixed seat fixedly mounted to said chuck body, and having a side surface;
   a rotary seat mounted to said fixed seat and rotatable relative to said fixed seat about a central axis, said rotary seat having a side surface that faces toward said side surface of said fixed seat, said side surface of said fixed seat and said side surface of said rotary seat cooperatively defining a gap therebetween that permits pressurized oil to flow therethrough;
   a plurality of flexible seal members each being centered at the central axis and each having a first annular segment that is fixedly mounted to said fixed seat, a neck segment that extends from said first annular segment and through said gap, and a second annular segment that is connected to an end of said neck segment distal from said first annular segment, that is disposed adjacent to said rotary seat and that cooperated with said first annular segment and said neck segment to define at least one oil groove thereamong, said second annular segments of at least one adjacent pair of said seal members being pushed to be in contact with said rotary seat when the pressurized oil is introduced into said gap, said second annular segments of said seal members being spaced apart from said rotary seat when the pressurized oil is ceased to be introduced into said gap; and
   a driving seat unit movably mounted to said rotary seat and moved by the pressurized oil for griping or releasing the workpiece.

2. The hydraulic chuck as claimed in claim 1, wherein said fixed seat further has a first oil inlet channel that has a first opening formed through said side surface of said fixed seat, a second oil inlet channel that has a second opening formed through said tide surface of said foxed seat, a distance between said first opening of said first oil inlet channel and the central axis being different from that between said second opening of said second oil inlet channel and the central axis, said rotary seat including a main body, and an auxiliary body that is co-rotatably mounted to said main body and that cooperates with said main body to define an operating space therebetween, said main body having said side surface of said rotary seat, a first oil path that is in fluid communication with said operating space and said first oil inlet channel and that has a first opening formed through said side surface of said rotary seat, a second oil path that is in fluid communication with said operating space and said second oil inlet channel and that has a second opening formed through said side surface of said rotary seat, a distance between said first opening of said first oil path and the central axis being different from that between said second opening of said second oil path and the central axis, said first oil path and said second oil path being respectively in fluid communication with two opposite ends of said operating space 303 along the central axis.

3. The hydraulic chuck as claimed in claim 2, wherein a distance between at least one of said seal members and the central axis is greater than either of the distance between said first opening of said first oil path and the central axis and the distance between said second opening of said second oil path and the central axis (L), a distance between at least one of said seal members and the central axis is smaller than either of the distance between said first opening of said first oil path and the central axis (L) and the distance between said second opening of said second oil path and the central axis, and a distance between at least one of said seal members and the central axis falls between the distance between said first opening or said first oil path and the central axis and the distance between said second opening of said second oil path and the central axis.

4. The hydraulic chuck as claimed in claim 3, wherein a distance between only one of said seal members and the central axis falls between the distance between said first opening of said first oil path and the central axis and the distance between said second opening of said second oil path and the central axis.

5. The hydraulic chuck as claimed in claim 4, wherein said side surface of said fixed seat and said side surface of said rotary seat are perpendicular to the central axis, said fixed seat 20 further having a plurality of fixed annular grooves that are formed in said side surface of said fixed seat, a distance between at least one of said fixed annular grooves and the central axis being greater than either of the distance between said first opening of said first oil inlet channel and the central axis and the distance between said second opening of said second oil inlet channel and the central axis, a distance between at least one of said fixed annular grooves and the central axis being smaller than either of the distance between said first opening of said first oil inlet channel and the central axis and the distance between said second opening of said second oil inlet channel and the central axis, a distance between only one of said fixed annular grooves and the central axis falling between the distance between said first opening of said first oil inlet channel and the central axis and the distance between said second opening of said second oil inlet channel and the central axis, said first annular segment of each of said seal members being fixedly mounted to a respective one of said fixed annular grooves, said main body of said rotary seat further having a plurality of rotary annular grooves that are formed in said side surface of said rotary seat and that are respectively aligned with said fixed annular grooves in the direction of the central axis, said second annular segment of each of said seal members being movably retained in a corresponding one of said rotary annular grooves, each of said rotary annular grooves being defined by a groove-defining surface, for each of said seal members, the thickness of said second annular segment in a radial direction is smaller than the width of the corresponding one of said rotary annular grooves in the radial direction, said second annular segments of at least one adjacent pair of said seal members being pushed to be in contact with said groove-defining surfaces that respectively define the corresponding pair of said rotary annular grooves when the pressurized oil is introduced into said gap.

6. The hydraulic chuck as claimed in claim 5, further comprising a first one-way valve that is mounted in said main body of said rotary seat and that is disposed on said first oil path, said first one-way valve permitting the pressurized oil to flow from said first oil inlet channel into said operating space therethrough, and preventing the pressurized oil from flowing from said operating space back to said first oil inlet channel therethrough.

7. The hydraulic chuck as claimed in claim 6, further comprising a second one-way valve that is mounted in said main body of said rotary seat and that is disposed on said second oil path, said second one-way valve permitting the pressurized oil to flow from said second oil inlet channel into said operating space therethrough, and preventing the pressurized oil from flowing from said operating space back to said second oil inlet channel therethrough.

8. The hydraulic chuck as claimed in claim 1, wherein, for each of said seal members, the thickness of said second annular segment in the direction of the central axis is smaller than the thickness of said first annular segment in the direction of the central axis.

* * * * *